United States Patent [19]
Borgholte et al.

[11] Patent Number: 6,120,851
[45] Date of Patent: Sep. 19, 2000

[54] COATING AGENT BASED ON A BRANCHED HYDROXYL GROUP-CONTAINING POLYESTER-MODIFIED POLYACRYLATE RESIN AND USE THEREOF

[75] Inventors: Harald Borgholte; Heinz-Peter Rink, both of Münster; Werner-Alfons Jung, Ascheberg; Michael Brünnemann, Münster, all of Germany

[73] Assignee: BASF Coatings AG, Muenster-Hiltrup, Germany

[21] Appl. No.: 09/230,532

[22] PCT Filed: Jul. 10, 1997

[86] PCT No.: PCT/EP97/03661

§ 371 Date: Jan. 25, 1999

§ 102(e) Date: Jan. 25, 1999

[87] PCT Pub. No.: WO98/03598

PCT Pub. Date: Jan. 29, 1998

[30] Foreign Application Priority Data

Jul. 24, 1996 [DE] Germany .................... 196 29 823

[51] Int. Cl.$^7$ .................... C09D 167/00; C08L 67/00
[52] U.S. Cl. ................................. 427/388.2; 427/409
[58] Field of Search .................... 427/388.2, 409

[56] References Cited

U.S. PATENT DOCUMENTS 5,093,408 3/1992 Jung et al. ....................... 524/512

FOREIGN PATENT DOCUMENTS 0 688 840 A2 6/1995 European Pat. Off. .
WO 94/22969 10/1997 WIPO .

Primary Examiner—Erma Cameron

[57] ABSTRACT

The present invention relates to a coating composition comprising
(A) at least one hydroxyl-containing component which [lacuna] of
  (A1) from 5 to 60% by weight of at least one polyester and
  (A2) from 40 to 95% by weight of at least one polyacrylate resin which has been prepared at least partially in the presence of component (A1) and
(B) at least one crosslinking agent, characterized in that component (A2) is obtainable from the monomer units:
(a) a cycloaliphatic ester of (meth)acrylic acid,
(b) a hydroxyl-containing alkyl ester of (meth)acrylic acid,
(c) a monomer which is different from (a) and (b) and has at least two polymerizable, olefinically unsaturated double bonds,
(d) optionally a further hydroxyl-containing, ethylenically unsaturated monomer which is different from (a), (b) and (c),
(e) an aliphatic ester of (meth)acrylic acid which is different from (a), (b), (c) and (d),
(f) a vinyl-aromatic hydrocarbon which is different from (a), (b), (c), (d) and (e), and
(g) a further ethylenically unsaturated monomer which is different from (a), (b), (c), (d), (e) and (f).

20 Claims, No Drawings

COATING AGENT BASED ON A BRANCHED HYDROXYL GROUP-CONTAINING POLYESTER-MODIFIED POLYACRYLATE RESIN AND USE THEREOF

This application is the national stage of International Application No. PCT/EP97/03661, filed Jul. 10, 1997.

FIELD OF THE INVENTION

The present invention relates to a coating composition comprising
(A) at least one hydroxyl-containing component which comprises
   (A1) from 5 to 60% by weight of at least one polyester and
   (A2) from 40 to 95% by weight of at least one polyacrylate resin which has been prepared at least partially in the presence of component (A1) and which is obtainable from:
      (a) a cycloaliphatic ester of methacrylic acid and/or acrylic acid, or a mixture of such monomers,
      (b) a hydroxyl-containing alkyl ester of methacrylic acid and/or acrylic acid, or mixtures of such monomers,
      (c) a monomer which is different from (a) and (b) and has at least two polymerizable, olefinically unsaturated double bonds,
      (d) optionally a hydroxyl-containing, ethylenically unsaturated monomer which is different from (a), (b) and (c), or a mixture of such monomers,
      (e) an aliphatic ester of methacrylic and/or acrylic acid which is different from (a), (b), (c) and (d), or a mixture of such monomers,
      (f) optionally a vinyl-aromatic hydrocarbon which is different from (a), (b), (c), (d) and (e), or a mixture of such monomers, and
      (g) optionally a further ethylenically unsaturated monomer which is different from (a), (b), (c), (d), (e) and (f), or a mixture of such monomers, and
(B) at least one crosslinking agent.

The present invention additionally relates to processes for producing a multicoat protective and/or decorative coating on a substrate surface and to the use of the coating compositions in the sector of automotive refinishing.

BACKGROUND OF THE INVENTION

Coating compositions are already known, from DE-A-40 24 204, which as binder contain a hydroxyl-containing polyacrylate resin which has been prepared in the presence of a hydroxyl-containing polyester. In particular if these coating compositions are applied at low temperatures, the masking resistance and the solvent resistance of the resulting coatings are, however, in need of improvement.

Coating compositions based on hydroxyl-containing polyacrylate resins and crosslinking agents are known, for example, from JP-A 4-1254. In this document, the hydroxyl-containing polyacrylate resins employed as binders are obtainable from hydroxyl-containing monomers, alkyl acrylates, alkyl methacrylates, optionally styrene and optionally ethylenically unsaturated polymers. In this case it is essential to the invention that the polyacrylate resin has been prepared using 4-tert-butylcyclohexyl acrylate and/or 4-tert-butylcyclohexyl methacrylate as monomer component. Hydroxyethyl acrylate and/or hydroxyethyl methacrylate, in particular, is employed as hydroxyl-containing monomer.

These coating compositions known from JP-A 4-1254, especially when used as transparent topcoat over a basecoat film, have the particular disadvantage that, when hydroxyethyl acrylate and/or hydroxyethyl methacrylate is used as OH monomer, the resulting coatings are of inadequate adhesion to the basecoat film. A further disadvantage of these coating compositions known from JP-A 4-1254 is the inadequate pot life of the coating compositions.

EP-B-0 158 161 discloses hydroxyl-containing acrylate copolymers produced by copolymerization of acrylate monomers having at least two olefinically unsaturated double bonds, hydroxyl-containing monomers and further olefinically unsaturated monomers, which together with melamine-formaldehyde resin as crosslinking agent can be employed as coating compositions.

A feature of these coating compositions known from EP-B-0 158 161 as well is that, especially when used as transparent topcoat over a basecoat film, they exhibit the disadvantage of resulting, when hydroxyethyl(meth)acrylate is used as hydroxyl-containing monomer, in coatings having inadequate adhesion to the basecoat film, and that the pot life of the coating compositions is inadequate.

EP-A-0 638 591 describes hydroxyl-containing copolymers which can be prepared by a bulk polymerization in which one component is included in the initial charge at the beginning of the polymerization and, in the subsequent course of the polymerization, at least two olefinically unsaturated monomers are added, of which at least one contains at least one carboxyl group and at least one is sterically hindered. Also described is the use of such copolymers in high-solids coating compositions. Again, the adhesion of such coating compositions in accordance with EP-A 0 638 591 to basecoat films is inadequate.

DE-A 44 07 415 discloses coating compositions which provide an outstanding solution to the problems resulting from the prior art to date. Such coating compositions include (A) at least one hydroxyl-containing polyacrylate resin, obtainable from (a) a cycloaliphatic ester of (meth)acrylic acid, (b) a hydroxyl-containing ester of (meth)acrylic acid, (c) optionally a hydroxyl-containing, ethylenically unsaturated monomer which is different from (a) and (b), (d) an aliphatic ester of (meth)acrylic acid which is different from (a), (b) and (c), (e) optionally a vinyl-aromatic hydrocarbon which is different from (a), (b), (c) and (d), and (f) optionally a further ethylenically unsaturated monomer which is different from (a), (b), (c), (d) and (e), and (B) at least one crosslinking agent.

When used as transparent topcoat over a pigmented basecoat film, the coating compositions according to DE-A-44-07 415 exhibit markedly improved adhesion to the basecoat film coupled with good chemical resistance and good weathering resistance. The coating compositions can be cured at low temperatures and can therefore be employed for the sector of automotive refinishing, Even when the coating compositions are cured at these low temperatures, the coating compositions rapidly cure fully but at the same time exhibit processability for a sufficiently long period. Moreover, the coating compositions according to DE-A-44 07 415 have the advantage of a good topcoat holdout, exhibit very good flow and good application properties under the conditions of automotive refinishing, and, when used as clearcoat over a basecoat film, they do not start to dissolve this film to any great extent. Recent requirements of the market necessitate, however, a level of adhesion which is improved again over the coating compositions according to DE-A-44 07 415 when the coating compositions are employed as clearcoat for the coating of basecoat films, and necessitate a further-increased gasoline resistance and improved polishability.

SUMMARY OF THE INVENTION

The problem on which the present invention is based was therefore to provide coating compositions which, when used as transparent topcoat over a pigmented basecoat film, lead to coatings having improved adhesion to the basecoat and possessing improved gasoline resistance.

At the same time, the resulting coatings should be of good chemical resistance and good weathering resistance. In addition, the coating compositions should be suitable for automotive refinishing, i.e. they should be fully curable at low temperatures of in general below 120 degrees C, preferably below 80 degrees C. Furthermore, the coating compositions should also reach full cure (rapid dust dryness and freedom from tack, and rapid through-drying) at these low temperatures while at the same time being able to be processed for as long (pot life) as possible. In addition, the coating compositions should exhibit good topcoat holdout and, when used as clearcoat over a basecoat film, should cause only minimal dissolution of the underlying basecoat film and should exhibit a good light/dark effect when viewed at different angles. Finally, the coating compositions should exhibit very good flow and good application properties under the conditions of automotive refinishing.

This problem is surprisingly achieved by a coating composition of the type mentioned initially, which is characterized in that component (A2) is a hydroxyl-containing component which is obtainable by polymerizing preferably:
(a) from 5 to 80% by weight of component (a),
(b) from 10 to 50% by weight of component (b),
(c) from 1 to 25% by weight of component (c),
(d) from 0 to 25% by weight of component (d),
(e) from 5 to 80% by weight of component (e),
(f) from 0 to 40% by weight of component (f) and
(g) from 0 to 40% by weight of component (g)
at least partially in the presence of the polyester (A1) to give a polyacrylate resin (A2), component (A1) being present to the extent of from 5 to 60% by weight and component (A2) to the extent of from 40 to 95% by weight, based in each case on (A), and the sum of the proportions by weight of components (a) to (g) always being 100% by weight, and the monomers or monomer mixtures employed as component (b) only being those which, on polymerization of the respective monomer alone, produce a polyacrylate resin and/or polymethacrylate resin having a glass transition temperature of from −10 to +6 degrees C or from +60 to 80 degrees C.

The present invention additionally relates to a process for producing a multicoat coating on a substrate surface using these coating compositions, and to the use of the coating compositions in the sector of automotive refinishing.

It is surprising and was not foreseeable that the novel coating compositions, when used as transparent topcoat over a pigmented basecoat film, exhibit markedly improved adhesion to the basecoat film while at the same time having good gasoline resistance, good chemical resistance and good weathering resistance. A further advantage is that the coating compositions can be cured fully at low temperatures and are suitable for use in the sector of automotive refinishing. Even when the coating compositions are cured at these low temperatures the coating compositions rapidly attain full cure, although at the same time are able to be processed for a long time. Moreover, the novel coating compositions have the advantage of a good topcoat holdout and, under the conditions of automotive refinishing, show very good flow and good application properties. Finally, when used as clearcoat over a basecoat film, the novel coating compositions have the advantage that they cause only minor dissolution of the basecoat film and exert only a very small influence on the metallic effect.

DETAILED DESCRIPTION OF THE INVENTION

The constituents of the coating composition

In the text below, the individual constituents of the novel coating composition will now be described in more detail.
Component (A) of the coating composition
The polyester resin (A1)

The polyesters (A1) are preferably obtainable by reacting
(p1) polycarboxylic acids or their esterifiable derivatives, together if desired with monocarboxylic acids,
(p2) polyols, together if desired with monools,
(p3) optionally further modifying components, and
(p4) optionally a component which is reactive with the reaction product of (p1), (p2) and, if used, (p3).

Examples of polycarboxylic acids which may be employed as component (p1) are aromatic, aliphatic and cycloaliphatic polycarboxylic acids.

Examples of suitable polycarboxylic acids (p1) are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-, 1,3- and 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and the like. The cycloaliphatic polycarboxylic acids (p1) can be employed both in their cis form and their trans form and as a mixture of both forms. Also suitable are the esterifiable derivatives of the abovementioned polycarboxylic acids (p1), such as, for example, their mono- or polyesters with aliphatic alcohols having 1 to 4 carbon atoms or hydroxy alcohols having 1 to 4 carbon atoms. It is additionally possible, as well, to employ the anhydrides of the abovementioned polycarboxylic acids (p1), provided they exist.

If desired, it is possible together with the polycarboxylic acids (p1) to employ monocarboxylic acids as well, for example benzoic acid, tert-butylbenzoic acid, lauric acid, isononanoic acid and fatty acids of naturally occurring oils. A preferred monocarboxylic acid employed is isononanoic acid.

Suitable polyol components (p2) for the preparation of the polyester or alkyd resin (A1) are polyhydric alcohols, such as ethylene glycol, propanediols, butanediols, hexanediols, neopentyl glycol, diethylene glycol, trimethylpentanediol, ethylbutylpropanediol, trimethylolpropane, ditrimethylolpropane, trimethylolethane, glycerol, pentaerythritol, dipentaerythritol, trishydroxyethyl isocyanate, polyethylene glycol, polypropylene glycol, together if desired with monohydric alcohols, for example butanol, octanol, lauryl alcohol, ethoxylated and/or propoxylated phenols.

Particularly suitable as component (p3) for the preparation of the polyesters (A1) are compounds containing at least one group which is reactive toward the functional groups of the polyester, with the exception of the compounds mentioned as component (p4). As modifying component (p3) it is preferred to use polyisocyanates and/or diepoxide compounds, and also, if desired, monoisocyanates and/or monoepoxide compounds. Examples of suitable components (p3) are described in DE-A-40 24 204 on page 4, lines 4 to 9.

As component (p4) for the preparation of the polyesters or alkyd resins (A1), suitable compounds are those having, in addition to a group which is reactive toward the functional groups of the polyester (A1), a tertiary amino group, examples being monoisocyanates having at least one tertiary amino group. For further details, reference is made to DE-A-40 24 204, page 4, lines 10 to 49.

The polyesters (A1) are prepared by the known methods of esterification (compare various standard works, such as, for example:
1. Temple C. Patton, Alkyd Resin Technology, Interscience Publishers John Wiley & Sons, New York, London 1962;
2. Dr. Johannes Schreiber, Chemie und Technologie der künstlichen Harze, Wissenschaftliche Verlagsgesellschaft mbH, Stuttgart, 1943;
3. Hans Wagner und Hans-Friedrich Sarx, Lackkunstharze, 4th Edition, Carl Hanser Verlag [sic], Munich, 1959;
4. Ullmanns Enzyklopädie der technischen Chemie, Volume 14, pages 80 to 106, 1963).

This reaction is commonly carried out at temperatures between 180 and 280 degrees C, optionally in the presence of an appropriate esterification catalyst, such as, for example, lithium octoate, dibutyltin oxide, dibutyltin dilaurate, p-toluenesulfonic acid and the like.

The preparation of the polyesters (A1) is customarily carried out in the presence of small quantities of an appropriate solvent as entraining agent for the water produced in the reaction. Examples of entraining agents employed are aromatic hydrocarbons, such as xylene in particular, and (cyclo)aliphatic hydrocarbons, especially cyclohexane.

The polyacrylate resin (A2) and the binder (A)

The polyacrylates employed as component (A2) in the novel coating compositions have OH numbers of from 60 to 180 mg of KOH/g, preferably from 100 to 150 mg of KOH/g, and acid numbers from 0 to 30 mg of KOH/g, preferably from 0 to 15 mg of KOH/g, the OH numbers and the acid numbers each being calculated without taking into account the polyester proportion.

It is essential to the invention that the polyacrylate resin (A2) has been prepared at least partially in the presence of the polyester resin (A1). Advantageously at least 40% by weight, and particularly advantageously at least 50% by weight, of component (A2), are prepared in the presence of component (A1).

Any remaining quantity of component (A2) is added to the binder solution and/or to the coating composition subsequently. In this case it is possible for this already polymerized resin to have the same monomer structural unit composition as the polyaddition resin synthesized in the presence of the polycondensation resin. However, it is also possible to add a hydroxyl-containing polyaddition resin and/or polycondensation resin which has a different monomer structural unit composition. Furthermore, it is possible to add a mixture of different polyaddition resins and/or polycondensation resins, in which optionally one resin has the same monomer composition as the polyaddition resin synthesized in the presence of the polycondensation resin.

The polyacrylate resin (A2) employed in accordance with the invention is preferably obtainable by polymerizing the components (a) from 5 to 80% by weight, preferably from 5 to 30% by weight, of a cycloaliphatic ester of methacrylic acid and/or acrylic acid, or of a mixture of such monomers, (b) from 10 to 50% by weight, preferably from 15 to 40% by weight, of a hydroxyl-containing alkyl ester of methacrylic acid and/or acrylic acid, or of a mixture of such monomers, (c) from 1 to 25% by weight, preferably from 2 to 20% by weight, of a monomer which is different from (a) and (b) and has at least two polymerizable, olefinically unsaturated double bonds, (d) from 0 to 25% by weight, preferably from 0 to 15% by weight, of a hydroxyl-containing, ethylenically unsaturated monomer which is different from (a), (b) and (c), or of a mixture of such monomers, (e) from 5 to 80% by weight, preferably from 5 to 30% by weight, of an aliphatic ester of methacrylic and/or acrylic acid which is different from (a), (b), (c), (d) and (f), or of a mixture of such monomers, (f) from 0 to 40% by weight, preferably from 10 to 30% by weight, of a vinyl-aromatic hydrocarbon which is different from (a), (b), (c), (d), (e) and (g), or of a mixture of such monomers, and (g) from 0 to 40% by weight, preferably from 0 to 30% by weight, of a further ethylenically unsaturated monomer which is different from (a), (b), (c), (d), (e) and (f), or of a mixture of such monomers, at least partially in the presence of the polyester resin (A1), to give a polyacrylate resin (A2) having an OH number of from 60 to 180, preferably from 100 to 150 mg of KOH/g, the sum of the proportions by weight of components (a) to (g) always being 100% by weight and the monomers or monomer mixtures employed as component (b) preferably only being those which, on polymerization of the respective monomer alone, produce a polyacrylate resin and/or polymethacrylate resin having a glass transition temperature of from −10 to +6 degrees C or from +60 to 80 degrees C.

The preparation of the polyacrylate resins (A2) employed in accordance with the invention can be carried out in accordance with the generally well-known polymerization techniques. Polymerization techniques for preparing polyacrylate resins are generally known and described in many references (compare for example: Houben-Weyl, Methoden der organischen Chemie, 4th Edition, Volume 14/1, pages 24 to 255 (1961)).

The novel polyacrylate resins (A2) are preferably prepared with the aid of a solution polymerization technique. In this technique, an organic solvent or solvent mixture is customarily charged to the reaction vessel together with the polyester (A1), and the mixture is heated to boiling. The monomer mixture (a) to (g) to be polymerized, of the polyacrylate component (A2) and one or more polymerization initiators and one or more polymerization regulators are then added continuously to said mixture of organic solvent or solvent mixture and polyester resin (A1).

The polymerization of the monomer components (a) to (g) is preferably carried out with the exclusion of oxygen, for example by working in a nitrogen atmosphere. The reactor is equipped with appropriate stirring, heating and cooling devices and with a reflux condenser in which volatile constituents, for example styrene, are retained. The polymerization reaction is carried out at temperatures of from 100 to 180 degrees C, preferably from 130 to 170 degrees C.

The polymerization is preferably carried out in a high-boiling organic solvent which is inert with respect to the monomers employed. Examples of suitable solvents are relatively highly substituted aromatic compounds, for example Solvent Naphtha®, heavy benzene, various Solvesso® grades, various Shellsol® grades and Deasol®, and also relatively high-boiling aliphatic and cycloaliphatic hydrocarbons, for example various white spirits, mineral turpentine oil, tetralin and decalin, and also various esters, for example ethylglycol acetate, butylglycol acetate, ethylglycol diacetate and the like.

As polymerization initiators it is preferred to employ initiators which form free radicals. The nature and quantity of initiator are commonly chosen such that the supply of radicals present during the feed phase at the polymerization temperature is as constant as possible. Examples of initiators suitable for the preparation of the polyacrylate resins (A2) are initiators containing tert-butyl groups, for example di-tert-butyl peroxide, tert-butyl hydroperoxide, 2,2-di-tert-butylperoxybutane and 1,3-bis-(tert-butylperoxyisopropyl-)-benzene, dibenzoyl peroxide, tert-butyl peroxy-2-ethylhexanoate, tert-butyl peroxy-3,5,5-trimethylhexanoate, tert-butyl peroxypivalate, tert-butyl peracetate, tert-butyl cumene peroxide, other peroxides such as dicumyl peroxide, cumyl peroxide, tert-amyl peroxybenzoate, tert-amylperoxy-2-ethylhexanoate, diacyl peroxides, for example diacetyl peroxide, peroxyketals, 2,2-di-(tert-amylperoxy-) propane, ethyl-3,3-di-(tert-amylperoxy-)-butyrate, and thermally unstable highly substituted ethane derivatives, based for example on silyl-substituted ethane derivatives and based on benzopinacol. Furthermore, it is also possible to employ aliphatic azo compounds, for example azoisovaleronitrile and azobiscyclohexanenitrile.

The quantity of initiator is in most cases from 0.1 to 8% by weight, based on the quantity of monomers to be processed, but can if desired also be higher. The initiator, dissolved in a portion of the solvent employed for the polymerization, is metered in gradually during the polymerization reaction. The initiator feed preferably lasts from about 0.5 to 2 hours longer than the monomer feed in order, in this way, to obtain a good action during the after-polymerization phase as well. If initiators are employed which have only a low decomposition rate under the prevailing reaction conditions, then it is also possible to include the initiator in the initial charge.

The polymerization regulators optionally present are employed in quantities of preferably at least 0.5% by weight, particularly preferably at least 2.5% by weight, based on the overall weight of the monomers, such that the polyacrylate (A) is copolymerized to give a precrosslinked, ungelled product. Examples of polymerization regulators employed are compounds containing mercapto groups, for example mercaptans or thioglycolic esters, or halogenated hydrocarbons.

The acid number of the polyacrylate resin (A2) is usually between 0 and 30 mg of KOH/g, preferably between 0 and 15 mg of KOH/g. The acid number of the polyacrylate resins employed in accordance with the invention can be adjusted by the person skilled in the art by the use of appropriate quantities of component (g). Similar comments apply to the adjustment of the hydroxyl number. It can be controlled by way of a quantity of component (b) and (d) employed.

Examples of cycloaliphatic esters of acrylic acid and/or methacrylic acid which are suitable as components (a) are cyclohexyl acrylate, cyclohexyl methacrylate, 4-tert-butylcyclohexyl acrylate, 4-tert-butylcyclohexyl methacrylate, isobornyl acrylate and isobornyl methacrylate. As component (a) it is particularly preferred to employ 4-tert-butylcyclohexyl acrylate and/or 4-tert-butylcyclohexyl methacrylate.

It is preferred that the monomers or monomer mixtures employed as component (b) are only those which, on polymerization of the respective monomer alone, produce a polyacrylate resin and/or polymethacrylate resin having a glass transition temperature of from −10 to +6 degrees C, or from +60 to 80 degrees C. This means that, when mixtures of different monomers are used as component (b), appropriate mixtures of course include those which, on polymerization of component (b) alone, produce a polyacrylate resin and/or polymethacrylate resin having a TG value which is outside these ranges indicated for the individual monomers.

The glass transition temperature can be calculated approximately by the person skilled in the art with the aid of the formula $$\frac{1}{T_G} = \sum_{n=1}^{n=x} \frac{W_n}{T_{Gn}}$$

$T_G$=glass transition temperature of the polymer
x=number of different monomers incorporated by polymerization,
$W_n$=proportion by weight of the nth monomer
$T_{Gn}$=glass transition temperature of the homopolymer of the nth monomer.

Component (b) is preferably selected from 3-hydroxypropyl methacrylate, 3-hydroxypropyl acrylate, 2-hydroxypropyl methacrylate and/or 2-hydroxypropyl acrylate.

Further suitable hydroxyl-containing monomers (component (d)) are hydroxyalkyl esters of alpha,beta-unaturated carboxylic acids containing primary or secondary hydroxyl groups. If the acrylate copolymer is required to be of high reactivity, it is possible to employ exclusively hydroxyalkyl esters containing primary hydroxyl groups; if the polyacrylate is to be less reactive, it is possible to employ exclusively hydroxyalkyl esters containing secondary hydroxyl groups. It is of course also possible to use mixtures of hydroxyalkyl esters containing primary hxydroxyl groups and hydroxyalkyl esters containing secondary hydroxyl groups. Examples of suitable hydroxyalkyl esters of alpha, beta-unsaturated carboxylic acids containing primary hydroxyl groups are hydroxybutyl acrylate, hydroxyamyl acrylate, hydroxyhexyl acrylate, hydroxyoctyl acrylate and the corresponding methacrylates. Examples of hydroxyalkyl esters which can be used and which contain a secondary hydroxyl group are 2-hydroxybutyl acrylate, 3-hydroxybutyl acrylate and the corresponding methacrylates. It is of course also possible in each case to employ the corresponding esters of other alpha,beta-unsaturated carboxylic acids, for example those of crotonic acid and of isocrotonic acid.

Advantageously, component (d) may at least in part be a reaction product of one mol of hydroxyethyl acrylate and/or hydroxyethyl methacrylate and on average two mol of epsilon-caprolactone. The component (d) employed may also be, at least in part, a reaction product of acrylic acid and/or methacrylic acid with the equivalent quantity of a glycidyl ester of a carboxylic acid having a tertiary alpha carbon atom. Glycidyl esters of highly branched monocarboxylic acids are obtainable under the trade name "Cardura®". The reaction of the acrylic acid or methacrylic acid with the glycidyl ester of a carboxylic acid having a tertiary alpha carbon atom can be carried out before, during or after the polymerization reaction.

As component (c) it is preferred to employ compounds of the general formula I

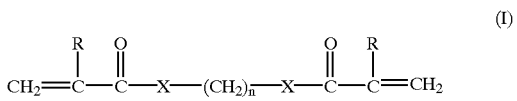

where: R is H or methyl,

X is O, NH, NR$_1$ where R$_1$=C1— to C10-alkyl, or S, and n is 2 to 8.

Examples of such compounds are hexanediol diacrylate, hexanediol dimethacrylate, glycol diacrylate, glycol dimethacrylate, butanediol diacrylate, butanediol dimethacrylate and similar compounds.

Component (c) may, furthermore, advantageously be a reaction product of a carboxylic acid having a polymerizable, olefinically unsaturated double bond with glycidyl acrylate and/or glycidyl methacrylate, or a poly- or monocarboxylic acid which is esterified with an unsaturated alcohol.

As component (c) it is also possible to employ aromatic compounds having at least 2 substituents, which have polymerizable, olefinically unsaturated groups, such as preferably divinylbenzene.

Furthermore, diallyl compounds can be used as component (c).

In addition, it is possible advantageously to use as component (c) a reaction product of a polyisocyanate with an unsaturated alcohol or with an unsaturated amine. An example hereof is the reaction product of 1 mol of hexamethylene diisocyanate and 2 mol of allyl alcohol.

A further advantageous component (c) is a diester of polyethylene glycol and/or polypropylene glycol having an average molecular weight of less than 1500, preferably less than 1000 daltons, with acrylic acid and/or methacrylic acid. In accordance with the invention it is possible as component (c), also, to employ acrylates having more than two ethylenically unsaturated double bonds, such as, for example, trimethylolpropane triacrylate, trimethylolpropane trimethacrylate, pentaerythritol tetraacrylate or pentaerythritol tetramethacrylate.

It is of course also possible to use combinations of these polyunsaturated monomers.

The monomers (e) employed in accordance with the invention are preferably selected such that polymerization of component (e) alone produces a polyacrylate resin and/or polymethacrylate resin having a glass transition temperature of from -70 to 120 degrees C.

Examples of monomers suitable as component (e) are methyl (meth)acrylate, ethyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, 2-ethylhexyl (meth)acrylate, furfuryl (meth)acrylate, octyl (meth)acrylate, 3,5,5-trimethylhexyl (meth) acrylate, decyl (meth)acrylate, lauryl (meth)acrylate, hexadecyl (meth)acrylate, octadecyl (meth)acrylate, stearyl (meth)acrylate and ethyltriglycol (meth)acrylate.

Vinyl-aromatic compounds are suitable as component (f) Component (f) preferably contains 8 to 9 carbon atoms per molecule. Examples of suitable compounds are styrene, vinyltoluenes, alpha-methylstyrene, chlorostyrenes, o-, m- or p-methylstyrene, 2,5-dimethylstyrene, p-methoxystyrene, p-tert-butylstyrene, p-dimethylaminostyrene, p-acetamidostyrene and m-vinylphenol. Preference is given to employing vinyltoluenes and, in particular, styrene.

Examples of compounds suitable as component (g) are unsaturated carboxylic acids, for example acrylic and/or methacrylic acid, maleic acid, fumaric acid, crotonic acid or isocrotonic acid, and also the anhydrides of these acids, alkoxyethyl acrylates, aryloxyethyl acrylates and the corresponding methacrylates, for example butoxyethyl (meth) acrylate and phenoxyethyl (meth)acrylate, and also methacrylonitrile and acrylonitrile, and also alkyl esters of other ethylenically unsaturated carboxylic acids, for example alkyl esters of crotonic and isocrotonic acid, and also polymerizable vinyl ethers and vinyl esters.

It is preferred to add to binder component (A), following its preparation, from 0.1 to 1% by weight, preferably from 0.4 to 0.9% by weight, of at least one aromatic mono- and/or polycarboxylic acid and/or at least one anhydride of an aromatic polycarboxylic acid. The quantity of acid and/or anhydride added in this case is based on the weight of the hydroxyl-containing binder (A), calculated as solid resin, in other words without solvent component. In this context it is preferred to add phthalic anhydride and monoesters of phthalic acid, benzoic acid and/or alkyl- and/or alkoxy-substituted benzoic acid. With particular preference, benzoic acid is added. The acid is preferably added at a temperature of from 20 to 120 degrees C, particularly preferably at a temperature of from 40 to 100 degrees C. The addition of the anhydride is preferably made at a temperature of from 100 to 180 degrees C, particularly preferably at a temperature of from 130 to 170 degrees C. In this case the acid and/or the anhydride can be added to the finished coating composition, in other words following the addition of pigments, fillers and auxiliaries and crosslinking agents. Preferably, however, the acid and/or the anhydride is added to the acrylate resin (A2) and is distributed with maximum homogeneity.

The novel coating compositions may also, if desired, contain one or more further hydroxyl-containing resins. For example, they may contain further hydroxyl-containing acrylate resins and/or polycondensation resins, different from constituents (A1) and (A2) of the novel binder component (A). These further binders are normally employed in a quantity of from 0 to 25% by weight, preferably from 0 to 20% by weight, based in each case on the overall weight of the coating composition and based on the solids content of the binder.

Examples of suitable further binders are, for example, the polyacrylate resins which are obtainable commercially under the name Macrynal® SM 510 and SM 513 from Hoechst, and the hydroxyl-containing polyacrylate resins which are described in German Patent Application DE-A-40 24 204 and are prepared in the presence of a polyester. For details, reference may be made to DE-A-40 24 204, especially page 3, line 18 to page 7, line 53.

Another suitable example of a further binder is a hydroxyl-containing polyacrylate resin which is obtainable by polymerizing (m1) from 10 to 51% by weight of a mixture of
  (m11) one or more monomers selected from the group 4-hydroxy-n-butyl acrylate and/or 4-hydroxy-n-butyl methacrylate and/or 3-hydroxy-n-butyl acrylate and/or 3-hydroxy-n-butyl methacrylate, and
  (m12) one of more monomers selected from the group 3-hydroxy-n-propyl acrylate and/or 3-hydroxy-n-propyl methacrylate and/or 2-hydroxy-n-propyl acrylate and/or 2- hydroxy-n-propyl methacrylate, (m2) from 0 to 20% by weight of a hydroxyl-containing ester of acrylic acid or of methacrylic acid having at least 5 carbon atoms in the alcohol residue, which ester-is different from (m1), or of a mixture of such monomers, (m3) from 28 to 85% by weight of an aliphatic or cycloaliphatic ester of acrylic acid or of methacrylic acid having at least 4 carbon atoms in the alcohol residue, which ester is different from (m1) and (m2), or of a mixture of such monomers, (m4) from 0 to 25% by weight of a vinyl-aromatic hydrocarbon which is different from (m1), (m2) and (m3), or of a mixture of such monomers, (m5) from 0 to 5% by weight of an ethylenically unsaturated carboxylic acid or of a mixture of ethylenically unsaturated carboxylic acids, and (m6) from 0 to 20% by weight of an ethylenically unsaturated monomer which is different from (m1), (m2), (m3), (m4) and (m5), or of a mixture of such monomers, to give a polyacrylate resin having a hydroxyl number of from 60 to 200 mg of KOH/g, an acid number of from 0 to 35 mg of KOH/g and a number-average molecular weight of from 1000 to 5000, the sum of the proportions by weight of components (m1) to (m6) being in each case 100% by weight.

Examples of compounds suitable as monomer components (m1) to (m6) are the compounds listed in connection with the description of the acrylate resin (A2).

The crosslinking agent (B)

The polyisocyanate component which is preferred as crosslinking agent (B) comprises any desired organic polyisocyanates having free isocyanate groups attached to aliphatic, cycloaliphatic, araliphatic and/or aromatic structures. It is preferred to employ polyisocyanates having 2 to 5 isocyanate groups per molecule. If desired, small quantities of organic solvent, preferably from 1 to 256 by weight based on pure polyisocyanate, may be added to the polyisocyanates so as to improve the ease of incorporation of the isocyanate. Examples of suitable solvent additives for the polyisocyanates are ethoxyethyl propionate, butyl acetate and the like.

Examples of suitable isocyanates are described, for example, in "Methoden der organischen Chemie", Houben-Weyl, Volume 14/2, 4th Edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and/or 2,4,4-trimethyl-1,6-hexamethylene diisocyanate, 1,12-dodecane diisocyanate, omega, omega'-diisocyanatodipropyl ether, cyclobutane-1,3-diisocyanate, cyclohexane-1,3- and -1,4-diisocyanate, 2,2- and 2,6-diisocyanato-1-methylcyclohexane, 3-isocyanatomethyl-3,5,5-trimethylcyclohexyl isocyanate ("isophorone diusocyanate"), 2,5- and 3,5-bis(isocyanatomethyl)-8-methyl-1,4-methanedecahydronaphthalene [sic], 1,5-, 2,5-, 1,6- and 2,6-bis(isocyanatomethyl)-4,7-methanehexahydroindane [sic], 1,5-, 2,5-, 1,6- and 2,6-bis(isocyanato)-4,7-methanehexahydroindane [sic] dicyclohexyl-2,4'- and -4,4'-diisocyanate, 2,4- and 2,6-hexahydrotolylene diisocyanate, perhydro-2,4'- and -4,4'-diphenylmethane diisocyanate, ω,ω'-diisocyanato-1,4-diethylbenzene, 1,3- and 1,4-phenylenediisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethyl-biphenyl, 4,4'-diisocyanato-3,3'-diphenyl-biphenyl, 2,4'- and 4,4'-diisocyanato-diphenylmethane, naphthylene-1,5-diisocyanate, tolylene diisocyanates, such as 2,4- and/or 2,6-tolylene diisocyanate, N,N'-(4,4'-dimethyl-3,3'-diisocyanatodiphenyl)-uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanato-triphenylmethane.

Preference is given to employing, in combination if desired with the abovementioned polyisocyanates, polyisocyanates which contain isocyanurate groups and/or biuret groups and/or allophanate groups and/or urethane groups and/or urea groups. Polyisocyanates containing urethane groups, for example, are obtained by reacting some of the isocyanate groups with polyols, for example trimethylolpropane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane-2,4'-diisocyanate or dicyclohexylmethane-4,4'-diisocyanate, or mixtures of these polyisocyanates. It is very particularly preferred to employ mixtures of polyisocyanates which are based on hexamethylene diisocyanate and contain uretdione and/or isocyanurate groups and/or allophanate groups, as are formed by catalytic oligomerization of hexamethylene diisocyanate using appropriate catalysts. The polyisocyanate component (B) may additionally comprise any desired mixtures of the polyisocyanates mentioned by way of example.

The quantity of the preferably employed crosslinking agent (B) is chosen such that the ratio of the isocyanate groups of the crosslinking agent to the hydroxyl groups of the binder component is in the range from 1:3 to 3:1. The novel coating compositions usually contain from 15 to 50% by weight of the polyester-modified acrylate resin (A), from 0 to 25% by weight of the further binder component and from 7 to 50% by weight of the crosslinking agent (B), based in each case on the overall weight of the coating composition and based on the solids content of the binder components and crosslinking components.

Other components of the novel coating composition

The novel coating compositions additionally contain one or more organic solvent. These solvents are usually employed in quantities of from 20 to 70% by weight, preferably from 30 to 60% by weight, based in each case on the overall weight of the coating composition. Examples of suitable solvents are relatively highly substituted aromatic compounds, for example Solvent Naphtha®, heavy benzene, various Solvesso® grades, various Shellsol® grades and Deasol®, and also relatively high-boiling aliphatic and cycloaliphatic hydrocarbons, for example various white spirits, mineral turpentine oil, tetralin and decalin and also various esters, for example ethylglycol acetate, butylglycol acetate, ethyldiglycol acetate and the like.

The novel coating compositions may additionally contain customary auxiliaries and additives in customary quantities, preferably from 0.01 to 10% by weight based on the overall weight of the coating composition. Examples of suitable auxiliaries and additives are leveling agents, such as silicone oils, plasticizers, such as phosphates and phthalates, viscosity-controlling additives, matting agents, UV absorbers, light stabilizers and, if desired, fillers.

Furthermore, the novel coating compositions may also contain customary pigments in customary quantities, preferably from 0 to 40% by weight based on the overall weight of the coating composition. Examples of suitable pigments are organic and inorganic color pigments and also metal pigments and/or special-effect pigments.

The preparation and the use of coating compositions

The coating compositions are prepared in a known manner by mixing and, if appropriate, dispersing the individual components.

These coating compositions can be applied in the form of a film to a substrate by a spraying, flowcoating, dipping, rolling, knife coating or spreading, the film subsequently being cured to give a firmly adhering coating.

These coating compositions are conventionally cured at room temperature or slightly elevated temperature, advantageously at temperatures below 120 degrees C, preferably at temperatures below 80 degrees C. However, the coating compositions can also be cured under baking conditions, in other words temperatures of at least 120 degrees C.

Suitable substrates are, in particular, metals and also wood, plastic, glass and the like. Owing to the short curing times and low curing temperatures, the novel coating compositions are preferably used for automotive refinishing, the finishing of large-size vehicles and truck bodies. However, depending on the crosslinking agent employed, they may also be employed for the production-line finishing of automobiles. Moreover, they are suitable as a pigment-containing solid-color topcoat. However, they are preferably employed as clearcoat especially over a metallic basecoat film or a solid-color basecoat film.

The present invention therefore also relates to a process for producing a multicoat protective and/or decorative coating on a substrate surface, in which
(1) a pigmented basecoat is applied to the substrate surface,
(2) a polymer film is formed from the basecoat applied in stage (1),
(3) to the basecoat thus obtained there is applied a transparent topcoat containing
   (A) a hydroxyl-containing component and
   (B) a crosslinking agent, and subsequently
(4) basecoat film and topcoat film are cured together, characterized in that the topcoat employed is the novel coating composition.

The basecoats employed in this process are known and therefore require no more detailed description. Examples of suitable basecoats are also the basecoats described in DE-A-41 10 520, in DE-A-40 09 000, in DE-A-40 24 204, in EP-A-355 433, in DE-A-35 45 618, in DE-A-38 13 866 and in DE-A-42 32 717.

Also suitable are the basecoats described in DE-A-43 27 416, which are characterized in that they contain a hydroxyl-containing polyester having a weight-average molecular weight Mw of 40,000–200,000 daltons and a polydispersity Mw/Mn>8, and in that the polyester has been prepared using at least 50% by weight of aromatic dicarboxylic acids or their esterifiable derivatives, but where the content of phthalic anhydride is no more than 80% by weight and the percentages by weight are based in each case on the overall weight of the acid components employed for the preparation of the polyester.

The novel coating compositions are particularly notable for good adhesion to the basecoat film, good mar resistance and high hardness of the resulting coatings. In addition, the coating compositions exhibit rapid drying coupled with long processability (pot life). Moreover, the resulting coatings, especially in the case of clearcoats, display good mechanical properties such as, for example, good gloss retention, good fullness and good leveling.

The invention will now be illustrated in more detail with reference to working examples. In these examples all parts and percentages are by weight unless expressly stated otherwise.

EXAMPLES

1. Preparation of polyester component A1

1.1. Preparation of a polyester resin A11

1229 parts of trimethylolpropane, 832 parts of isononanoic acid, 1295 parts of 1,4-cyclohexanedicarboxylic acid and 140 parts of xylene are placed in a 4l polycondensation reactor with stirrer, steam-heated column and water separator, and are slowly heated. Condensation is carried out at a maximum temperature of 202 degrees C to an acid number of 10 mg of KOH/g and a viscosity of 4.2 dPas (60%i strength in xylene). The mixture is subsequently cooled, diluted at 130 degrees C with 1427 parts of Shellsol® A, and cooled further to room temperature. The resulting polyester A11 has a solids content of 63.2%, an acid number of 10.3 mg of KOH/g, a (theoretical) OH number of 143.1 mg of KOH/g and a viscosity of 16.0 dPas (original). The number-average molecular weight Mn is 1500 daltons, the weight-average molecular weight Mw is 3500 daltons and the polydispersity Mw/Mn is 2.3 (determined in each case by gel permeation chromatography against polystyrene standard).

1.2. Preparation of a polyester resin A12

419 parts of trimethylolpropane, 325 parts of neopentyl glycol, 805 parts of neopentylglycol hydroxypivalate, 315 parts of isophthalic acid, 642 parts of hexahydrophthalic anhydride, 179 parts of adipic acid, 0.8 parts of catalyst (Fascat® 4100 from Atochem) and 104 parts of xylene are placed in a 4l polycondensation reactor with stirrer, steam-heated column and water separator, and are slowly heated. Condensation is carried out at a maximum temperature of 208 degrees C to an acid number of 4.7 mg of KOH/g and a viscosity of 1.2 dPas (60% strength in xylene). The mixture is subsequently cooled, diluted at 130 degrees C with 730 parts of Shellsol® A, and cooled further to room temperature.

The resulting polyester A12 has a solids content of 75.0%, an acid number of 4.7 mg of KOH/g, a (theoretical) OH number of 204.1 mg of KOH/g and a viscosity of 3.5 dPas (60% strength solution in Shellsol® A). The number-average molecular weight Mn is 1100 daltons, the weight-average molecular weight Mw is 2600 daltons and the polydispersity Mw/Mn is 2.36 (determined in each case by gel permeation chromatography against polystyrene standard).

2. Preparation of the novel polyester-modified hydroxyl-containing binder component A and also of a polyester-modified binder component V (without monomer (c) in the polyacrylate) as comparison example The preparation of the novel hydroxyl-containing polyester-modified component A and of the polyester-modified binder component V as comparison is carried out in each case in a 4l stainless-steel polymerization vessel with stirrer, reflux condenser, a monomer feed and an initiator feed. The components indicated in each case in Table 1 are weighed in and then the initial charge is heated to 145 to 152 degrees C.

All feeds are begun simultaneously; the monomer feed is metered in at a uniform rate over the course of 4 hours, the initiator feed is metered in at a uniform rate over the course of 4.5 hours. During polymerization the temperature in the reactor is held at 145 to 152 degrees C. This is followed by after-polymerization for 2 hours more. The acrylate resin solution thus obtained has a solids content of 70%. The temperature is subsequently lowered to 110 degrees C and the acrylate resin is-diluted with butyl acetate to a solids content of 60%.

The quantities of the polyester resin A11 or A12 indicated in each case in Table 1, and also the quantity of Shellsol® A indicated in Table 1, are weighed into the initial charge.

The quantities of styrene, methyl methacrylate, hexanediol (meth)acrylate, 4-tert-butylcyclohexyl acrylate, butyl methacrylate, hyroxypropyl [sic] methacrylate indicated in each case in Table 1, and in each case the indicated quantities of triisodecyl phosphite and mercaptoethanol, are weighed into the monomer feed.

In the preparation of the novel binder component A, 3.13 parts of tert-butyl peroxyethylhexanoate and 5.53 parts of Shellsol® A are weighed into the initiator feed.

In the preparation of the binder component V, 1.17 parts of tert-butyl cumyl hydroperoxide and 5.23 parts of Shellsol® A (commercially available aromatic solvent mixture having a boiling range from 165 to 185 degrees C) are weighed into the initiator feed.

The properties of the resulting binder components A and V (comparison) are shown in Table 2.

3. Preparation of the coating compositions containing the binders according to Example 2

3.1. Preparation of a curing agent solution

A curing agent solution is prepared from the components indicated below, by mixing:

| | |
|---|---|
| butyl acetate 98% | 1.5 parts |
| xylene | 7.5 parts |
| butylglycol acetate | 11.0 parts |
| catalyst solution[1] | 4.0 parts |
| Desmodur ® N 3390[2] | 50.6 parts |
| Solventnaphtha ® | 10.0 parts |
| Baysilon ® Lackadditiv OL44[3] | 0.6 parts |
| i-methoxypropyl 2-acetate | 14.0 parts |

[1]catalyst solution described under section 3.3
[2]commercial polyisocyanate from Bayer AG, a 90% strength solution in butyl acetate/solvent naphtha 1:1 based on a hexamethylene diisocyanate trimer having a number-average molecular weight Mn of about 700 daltons, a mean functionality of between 3 and 4 and a content of uretdione groups of between 0 and 5% by weight
[3]commercial leveling agent based on a polyether-modified methylpolysiloxane, from Bayer AG 3.2. Preparation of an adjustment additive An adjustment additive is prepared from the components indicated below, by mixing:

| | |
|---|---|
| xylene | 15.0 parts |
| Naphtha ®solvent | 13.0 parts |
| petroleum spirit 135/180 | 10.0 parts |
| butylglycol acetate | 3.0 parts |
| butyl acetate (98/100) | 50.0 parts |
| 1-methoxypropyl 2-acetate | 5.0 parts |
| butoxyl | 2.0 parts |

3.3. Preparation of a catalyst solution 1.0 parts of dibutyltin dilaurate are mixed with 50.0 parts of butyl acetate 98/100 and 49.0 parts of xylene.

3.4. Preparation of the clearcoat solutions KA and KV (comparison example)

The clearcoat solutions KA (according to the invention) and KV (comparison) are prepared from the components indicated in Table 3, by mixing.

3.5. Preparation of the transparent topcoats KA' and KV' (comparison example)

The transparent topcoats KA' and KV' are prepared by mixing in each case 100 parts by volume of the clearcoat solutions KA and, respectively, KV with 50 parts by volume of the above-described curing agent solution (Example 3.1) and 10 parts by volume of the above-described adjustment additive (Example 3.2).

The coating material obtained in this way is then applied to phosphatized and coated steel panels. For this purpose the phosphatized steel panels are coated by spraying with a conventional commercial filler (commercial product Glasurit Grundfüller [primer surfacer] EP 801-1552 from Glasurit GmbH, Münster, with an epoxy-functional binder and an amino-functional curing agent) (dry film thickness from about 40 to 60 μm), dried at 80 degrees C for 45 minutes and at room temperature for 16 h, and sanded with P800 sandpaper and an eccentric sander. Subsequently, a basecoat is applied which comprises a mixture of 80 parts of conventional commercial metallic basecoat (commercial product Basislack [basecoat] AE 54M 99/9 Basisfarbe Aluminium superfein from Glasurit GmbH, Münster) based on a hydroxyl-containing polyester, cellulose acetobutyrate, wax and a melamine resin, and 20 parts of a further conventional commercial basecoat (commercial product Basislack [basecoat] AE 54M 552 Basisfarbe Helioblau from Glasurit GmbH, Münster) based on a hydroxyl-containing polyester, cellulose acetobutyrate, wax and a melamine resin, by first of all applying one spraypass and, after an intermediate flash-off time of 5 minutes, applying a second spraypass (spray pressure in each case 4 to 5 bar). The dry film thickness of the basecoat is about 20 μm. After a flash-off time of 30 minutes the clearcoat is applied by first of all applying one spraypass and, after an intermediate flash-off time of 3 minutes, applying a second spraypass (spray pressure in each case 4 to 5 bar). The panels are then dried under different conditions depending on the test carried out. The dry film thickness of the clearcoat is from about 50 to 80 μm.

The results of testing of the resulting coatings are shown in Table 4.

TABLE 1

Composition of components A and V

| Constituents of the binder | A | V |
|---|---|---|
| A11 (polyester acc. to Ex. 1.1) | 6.69 | |
| A12 (polyester acc. to Ex. 1.2) | | 7.79 |
| Shellsol A | 17.69 | 18.51 |
| Styrene | 11.99 | 12.08 |
| n-butyl methacrylate | 3.13 | 3.15 |
| t-butylcyclohexyl acrylate | 7.31 | 7.35 |
| methyl methacrylate | 8.89 | 11.03 |
| hydroxy-n-propyl acrylate 25% by weight of 3-hydroxy-[sic]/75% by weight of 2-hydroxy-n-propyl acrylate | 18.79 | 18.91 |
| hexanediol diacrylate | 2.09 | — |
| mercaptoethanol | 0.254 | 0.26 |
| triisodecyl phosphite | 0.135 | 0.14 |

TABLE 2

Properties of components A and V

| | A(1) | V1 |
|---|---|---|
| OH number [mg of KOH/g] | 130 | 134 |
| acid number [mg of KOH/g] | 2.8 | 2.3 |
| solids content [%] | 59.4 | 61.3 |
| Viscosity[1] [dPas] | 1.7 | 2.5 |

[1]Viscosity of a 50% strength solution of the acrylate resin in butyl acetate at 23 degrees C.

TABLE 3

Composition of the clearcoat solutions in parts by weight

| Clearcoat solution | KA | KV |
|---|---|---|
| A[1] | 87.0 | — |
| V1[1] | — | 87.0 |
| LS1[2] | 0.9 | 0.9 |
| LS2[3] | 0.9 | 0.9 |
| DBTL[4] | 2.0 | 2.0 |
| LAS[5] | 3.8 | 3.8 |
| BGA[6] | 2.4 | 2.4 |

TABLE 3-continued

Composition of the clearcoat solutions in parts by weight

| Clearcoat solution | KA | KV |
|---|---|---|
| BA[7] | 3.0 | 3.0 |
| SC(%)[8] | 52.2 | 52.2 |

Key to Table 3
[1] solutions described in Table 1 of the binder components A (according to the invention) and V (comparison), all of which have however been adjusted with butyl acetate to a uniform solids content of 58%
[2] Tinuvin ® 292 from Ciba Geigy, commercial light stabilizer based on a sterically hindered amine (HALS)
[3] Tinuvin ® 1130 from Ciba Geigy, commercial light stabilizer based on benzotriazole
[4] catalyst solution according to Example 3.3
[5] leveling agent solution according to Example 3.4
[6] butylglycol acetate
[7] butyl acetate 98% strength
[8] Solids content

TABLE 4

Test results of the applied topcoats KA' (novel) and KV' (comparison)

|  | KA' | KV' |
|---|---|---|
| appl. topcoat |  |  |
| Adhesion | 16 | 20 |
| Viscosity (s) | 20 | 20 |
| after 2h | 29 | 27 |
| dust dry (min) | 90 | 110 |
| tack-free (min) | 240 | 290 |
| gasoline test (days) | 8 | 16 |
| Volvo test | m0/g0 | m0/g0 |
| color (comparison) |  |  |
| viewed straight on | identical | identical |
| viewed at an angle | identical | identical |
| assessment | satisfactory | satisfactory |

Key to Table 4
The tests indicated in Table 4 are carried out as follows:
Adhesion: Testing with the high-pressure cleaner:
High-pressure cleaner
80 bar pressure
throughput 800l/h
temperature: cold
distance of the nozzle from the test panel: 5 cm The test coating material is applied as described in Example 3.5 to a 40×60 cm steel panel and dried at 60 degrees C for 30 minutes. Following storage at room temperature for 7 days, a knife is used to cut a triangle whose sides are 10 cm long through the coats of paint. The cut must be made to the substrate. The sides of the triangle are subsequently subjected to the jet of the high-pressure cleaner for 10 s in each case. Evaluation: a metal lattice, cut in squares, with a mesh size of ½ inch (1.3 cm) and a total edge length of 6 inches (15.4 cm) is placed over the triangle (144 squares). A count is made of each square in which there is a loss of adhesion between clearcoat and basecoat.
Viscosity:
The viscosity is measured in each case with the flow time in the DIN 4 cup at 20 degrees C.
Dust dryness:
About 15 minutes after the application of the coating material by spraying, a small sample of marine sand (3 to 4 g) is scattered on one corner of the panel. The panel is then dropped on one edge from a height of 30 cm (free fall). Dust dryness is attained when no sand adheres. The test is repeated at 15-minute intervals; shortly before dust dryness is attained the repetition interval is shortened to 5 minutes.
Freedom from tack:
About 20 minutes after dust dryness has been attained, a piece of paper of about 3cm$^2$ is placed on the coated panel. A small plate of hard plastic is placed on this paper, and a weight of 100 g is then placed on this plate. After precisely 1 minute, testing is carried out as in the test for dust dryness, to see whether the paper still adheres. Testing is repeated at 15-minute intervals; shortly before freedom from tack is attained, the repetition interval is shortened to 5 minutes.
Gasoline test:
As described above, the clearcoat is applied to phosphatized, coated steel panels which are coated with the above-described filler and basecoat, and dried at room temperature. The gasoline resistance is first tested after storage at room temperature for 24 hours.
Procedure: a wadding pad (filter grade, type T950, size 2.3 from Seitz) impregnated with 1 ml of premium-grade gasoline (lead-free), and whose bottom face possesses a lattice structure, is laid on the coat of paint and subjected for 5 minutes to a weight of 100 g. The structure brought about by the swelling-up of the paint surface is then assessed visually: not marked, very slightly marked, slightly marked, marked, heavily marked, very heavily marked. The value indicated is the period of storage at room temperature, in days, after which the gasoline test is satisfactory, i.e. no marking is visible.
Volvo test:
Test conditions 1 cycle:
4 h at 50 degrees C in an oven
2 h at 35 degrees C and 95–100% rel. atmospheric humidity
2 h at 35 degrees 95–100% rel. atmospheric humidity and 21 of sulfur dioxide
16 h at −30 degrees in a deep-freeze cabinet wash panel with water and dry
Evaluation:
  degree of blistering in accordance with DIN 53209 cracks ASTM D660
Color in accordance with DIN 6174:
Standard light source D
3 angle measuring instrument MMK111, Datacolor The base color used was a mixture of the commercial base colors from BASF L+F, (Münster-Hiltrup, Germany) series 54. A mixture of 80 parts by weight 54M 99/9 Basisfarbe Aluminium superfein and 20 parts by weight 54M 552 Basisfarbe Helioblau was employed. The test coating material is applied as described in section II.6. [sic] to a 40×60 cm steel panel and dried at 60 degrees C for 30 minutes. After storage at room temperature for 24 hours, the color test is carried out.

The panels are assessed under an Osram Universal white neon lamp:
1. Viewed straight on: the panels are compared with standard panel (coated with the clearcoat KA or KV) at an angle of about 20 degrees to the vertical.
2. Viewed at an angle: the panels are compared with the standard panel (coated with a clearcoat KA or KV) at an angle of about 70 degrees to the vertical.
Evaluation:
The light/dark change between the straight-on view and angular view should be as pronounced as possible. The straight-on view is satisfactory if the panel with the test clearcoat is of equal lightness to or greater lightness than the standard panel. The angular view is satisfactory if the panel with the test coating material is of equal lightness to or lesser lightness than the standard panel.

What is claimed is:

1. A coating composition comprising at least one hydroxyl-containing binder component (A) consisting of:
   (A1) from 5 to 60% by weight of at least one polyester and
   (A2) from 40 to 95% by weight of at least one polyacrylate which has been prepared at least partially in the presence of the polyester (A1), and
   (B) at least one crosslinking agent, characterized in that component (A2) results from the polymerization of the monomer units:
   (a) one or more monomers selected from the group consisting of a cycloaliphatic ester of methacrylic acid, a cycloaliphatic ester of acrylic acid, and a mixture of such monomers,
   (b) one or more monomers selected from the group consisting of a hydroxyl-containing alkyl ester of methacrylic acid, a hydroxyl-containing alkyl ester of acrylic acid, and mixtures of such monomers,
   (c) one or more monomers which are selected from those monomers which are different from (a) and (b) and have at least two polymerizable, olefinically unsaturated double bonds, and mixtures thereof,
   (d) optionally, one or more hydroxyl-containing ethylenically unsaturated monomers which are different from (a), (b), (c), or a mixture of such monomers,
   (e) one or more monomers which are different from (a), (b), (c), and (d) and are selected from the group consisting of an aliphatic ester of methacrylic acid, an aliphatic ester of acrylic acid and a mixture of such monomers,
   (f) optionally a vinyl-aromatic hydrocarbon which is different from (a), (b), (c), (d) and (e), or a mixture of such monomers, and
   (g) optionally a further ethylenically unsaturated monomer which is different from (a), (b), (c), (d), (e), and (f), or a mixture of such monomers.

2. The coating composition of claim 1, comprising polyacrylate (A2) resulting from the polymerization of:
   (a) from 5 to 80% by weight of component (a),
   (b) from 10 to 50% by weight of component (b),
   (c) from 1 to 25% by weight of component (c),
   (d) from 0 to 25% by weight of component (d),
   (e) from 5 to 80% by weight of component (e),
   (f) from 0 to 40% by weight of component (f), and
   (g) from 0 to 40% by weight of component (g)
to give a polyacrylate resin (A2) having an OH number of from 60 to 180 mg of KOH/g, the sum of the proportions by weight of components (a) to (g) always being 100% by weight.

3. The coating composition of claim 1, characterized in that the monomers or monomer mixtures employed as component (b) only are those which, on polymerization of the respective monomer alone, produce a polyacrylate resin and/or polymethacrylate resin having a glass transition temperature of from −10 to +6 degrees C or from +60 to 80 degrees C.

4. The coating composition of claim 3, characterized in that component (b) is selected from the group consisting of 3-hydroxypropyl methacrylate, 3-hydroxypropyl acrylate, 2-hydroxypropyl methacrylate, 2-hydroxypropyl acrylate, and mixtures thereof.

5. The coating composition of claim 1, wherein component (c) comprises

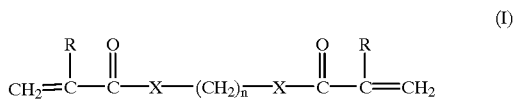

where: R is H or methyl,
   x is O, NH, NR$_1$ where R$_1$=C1— to C10— alkyl, or S, and
   n is 2 to 8.

6. The coating composition of claim 1, characterized in that component (d) is selected such that polymerization of component (d) alone produces a polyacrylate resin and/or polymethacrylate resin having a glass transition temperature of from −70 to +120 degrees C°.

7. The coating composition of claim 6, characterized in that component (d) is selected from the group consisting of n-butyl methacrylate, n-butyl acrylate, tert-butyl methacrylate, tert-butyl acrylate, isobutyl methacrylate, isobutyl acrylate, methyl methacrylate, methyl acrylate, 2-ethylhexyl methacrylate, 2-ethylhexyl acrylate, lauryl methacrylate, lauryl acrylate, stearyl methacrylate, stearyl acrylate, ethyltriglycol methacrylate, furfuryl methacrylate, furfuryl acrylate, and mixtures thereof.

8. The coating composition of claim 1, wherein component (a) is selected from the group consisting of cyclohexyl methacrylate, cyclohexyl acrylate, isobornyl methacrylate, isobornyl acrylate, 4-tert-butylcyclohexyl acrylate, 4-tert-butylcyclohexyl methacrylate and and mixtures thereof.

9. The coating composition of claim 2, wherein polyacrylate resin (A2) is obtained by polymerizing:
   (a) from 5 to 30% by weight of component (a),
   (b) from 15 to 40% by weight of component (b),
   (c) from 2 to 20% by weight of component (c),
   (d) from 0 to 15% by weight of component (d),
   (e) from 5 to 30% by weight of component (e),
   (f) from 10 to 30% by weight of component (f), and
   (g) from 0 to 30% by weight of component (g)
the sum of the proportions by weight of components (a) to (g) being always 100% by weight.

10. The coating composition of claim 1, characterized in that polyacrylate resin (A2) has an OH number of from 100 to 150 mg of KOH/g.

11. The coating composition of claim 1, characterized in that the polyester (A1) has an OH number of from 90 to 130, an acid number of less than 30 mg of KOH/g and a number-average molecular weight Mn of from 1000 to 3500 daltons.

12. The coating composition of claim 1, further comprising from 0.1 to 1% by weight, based on the weight of component (A) without solvents, of at least one member selected from the group consisting of an aromatic mono carboxylic acid, an aromatic polycarboxylic acid, an anhydride of an aromatic carboxylic acid, or mixtures thereof.

13. The coating composition of claim 1, characterized in that at least 40% by weight of component (A2) has been prepared in the presence of component (A1).

14. The coating composition of claim 1, characterized in that the coating composition contains as crosslinking agent (B) a member selected from the group consisting of diisocyanates, polyisocyanates, and mixtures thereof.

15. The coating composition of claim 1 further comprising at least one further binder which is different from component (A).

16. A process for the production of a multicoat protective and/or decorative coating on a substrate surface, comprising
(1) applying a pigmented basecoat to a substrate surface,
(2) forming a polymer film from the pigmented basecoat applied in (1),
(3) applying to the polymer film thus obtained a transparent topcoat containing the novel binder component (A) and a crosslinking agent (B), and
(4) curing the polymer film and applied transparent topcoat together.

17. A process for the repair of a previously cured coated substrate, comprising applying to a previously cured coated substrate the coating composition of claim 1.

18. The coating composition of claim 8, wherein component (a) is selected from the group consisting of 4-tert-butylcyclohexyl acrylate, 4-tert-butylcyclohexyl methacrylate, and mixtures thereof.

19. The coating composition of claim 14 characterized in that the coating composition contains as crosslinking agent (B) at least one member selected from the group consisting of diisocyanates containing one or more isocyanurate groups, polyisocyanates containing one or more isocyanurate groups, and mixtures thereof.

20. The coating composition of claim 15 further comprising at least one further binder selected from the group consisting of at least one further polyacrylate resin which is different from (A2), at least one polycondensation resin which is different from (A1), and mixtures thereof.

* * * * *